US010057789B2

(12) United States Patent
Blanda, Jr. et al.

(10) Patent No.: US 10,057,789 B2
(45) Date of Patent: *Aug. 21, 2018

(54) CONTROLLING USE OF A COMMUNICATIONS DEVICE IN ACCORDANCE WITH MOTION OF THE DEVICE

(71) Applicant: AT&T Intellectual Property I, L.P., Atlanta, GA (US)

(72) Inventors: Joseph Blanda, Jr., Flemington, NJ (US); Michael Demblewski, Celebration, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/304,241

(22) Filed: Jun. 13, 2014

(65) Prior Publication Data

US 2014/0295817 A1    Oct. 2, 2014

Related U.S. Application Data

(63) Continuation of application No. 13/751,235, filed on Jan. 28, 2013, now Pat. No. 8,838,185, which is a
(Continued)

(51) Int. Cl.
| | | |
|---|---|---|
| *H04M 1/00* | (2006.01) | |
| *H04W 24/02* | (2009.01) | |
| *H04W 4/02* | (2018.01) | |
| *H04M 1/60* | (2006.01) | |
| *H04M 1/725* | (2006.01) | |

(52) U.S. Cl.
CPC ....... *H04W 24/02* (2013.01); *H04M 1/72577* (2013.01); *H04W 4/027* (2013.01); *H04M 1/6075* (2013.01); *H04M 1/72572* (2013.01); *H04M 2242/04* (2013.01)

(58) Field of Classification Search
CPC ....... H04M 1/6075; H04W 4/00; H04W 4/12; H04W 4/20; H04W 4/16; H04W 4/24; H04W 76/005; H04W 76/02; H04W 76/06; H04W 80/00; H04W 84/042; H04W 88/02; H04W 88/04; H04W 8/26; H04W 92/02
USPC ... 455/404.1, 404.2, 418, 419, 414.1, 569.1, 455/569.3
See application file for complete search history.

(56) References Cited

U.S. PATENT DOCUMENTS

| | | | | |
|---|---|---|---|---|
| 8,315,617 B2 * | 11/2012 | Tadayon | ................. | H04M 3/53 455/418 |
| 8,428,973 B1 * | 4/2013 | Hopkins, III | .......... | G06Q 40/08 705/2 |

(Continued)

*Primary Examiner* — Amancio Gonzalez
(74) *Attorney, Agent, or Firm* — Baker & Hostetler LLP

(57) ABSTRACT

A wireless communications device is controlled in accordance with motion thereof. If the device is determined to be in motion, such as in a vehicle, use of the device is restricted. Discrimination between vehicular motion and ambulatory motion is provided. While in motion, use of the device can be allowed under specific exception conditions. Exception conditions include the device being used by a passenger of a vehicle, a 911 call, or a call to a designated number. The ability to control the device in accordance with motion thereof can be remotely activated and deactivated, thus allowing, for example, parental control of a device belong to a child.

20 Claims, 5 Drawing Sheets

Related U.S. Application Data continuation of application No. 12/642,919, filed on Dec. 21, 2009, now Pat. No. 8,385,982.

(56) References Cited

U.S. PATENT DOCUMENTS

| | | | |
|---|---|---|---|
| 8,565,820 B2* | 10/2013 | Riemer | H04M 1/72577 455/345 |
| 8,594,705 B2* | 11/2013 | Osann, Jr. | 455/456.3 |
| 2009/0098855 A1* | 4/2009 | Fernandez et al. | 455/410 |
| 2010/0297929 A1* | 11/2010 | Harris | H04K 3/415 455/1 |
| 2011/0039581 A1* | 2/2011 | Cai | G01S 19/14 455/456.4 |
| 2011/0077032 A1* | 3/2011 | Correale | H04M 1/72569 455/466 |

* cited by examiner

CONTROLLING USE OF A COMMUNICATIONS DEVICE IN ACCORDANCE WITH MOTION OF THE DEVICE

CROSS REFERENCE TO RELATED APPLICATIONS

The instant application is a continuation of, and claims priority to, U.S. patent application Ser. No. 13/751,235, filed Jan. 28, 2013. U.S. patent application Ser. No. 13/751,235 is a continuation of U.S. patent application Ser. No. 12/642,919, filed Dec. 21, 2009, now U.S. Pat. No. 8,385,982. U.S. patent application Ser. No. 12/642,919, now U.S. Pat. No. 8,385,982 is incorporated herein by reference in its entirety. U.S. patent application Ser. No. 13/751,235 is incorporated herein by reference in its entirety.

TECHNICAL FIELD

The technical field generally relates to controlling a communications device and more specifically relates to controlling a communications device in accordance with motion of the communications device.

BACKGROUND

Many wireless subscribers use their wireless devices in an unsafe manner while operating a vehicle. The number of wireless handset devices in use is increasing at a rapid rate. This growth has led to the rise of careless and unsafe wireless driving practices. Far too many wireless subscribers utilize their wireless devices for voice calls while driving a car, without an accompanying hands free headset. A similar rise in unsafe messaging, email, and browsing on wireless devices, while driving is occurring.

SUMMARY

A communications device is controlled in accordance with motion thereof. If the communications device is determined to be in motion, use of the device is restricted. This mechanism provides proactive prevention and deterrence of unsafe use of a communications device (e.g., wireless communications device) while driving. Discrimination between vehicular motion, motion of the communications device in the hand of a user, and ambulatory motion is provided. A bypass mechanism is provided under exception conditions, such as an emergency call, a 911 call, and calls to designated numbers. Thus, while in motion, use of the device can be allowed under the specific exception conditions. The ability to control the device in accordance with motion thereof can be remotely activated and deactivated, thus allowing, for example, parental control of a device belong to a child. Parental control mechanisms can be remotely administered via a network, such as the Internet, or the like. Restricted use includes, for example, disabling a microphone and/or earpiece sound, warning tones, and/or outright prevention of call setup.

DETAILED DESCRIPTION OF ILLUSTRATIVE EMBODIMENTS

A determination as to whether a communications device (e.g., wireless communications device such as a cellular phone or the like) is in motion is used to determine whether use of the communications device should be allowed or restricted. In an example embodiment, a combination of Global Positioning System (GPS) technology embedded into communications devices in conjunction with hands free connection detecting technology is utilized to determine if a communications device in motion is utilizing a paired hands free apparatus, such as a headset or the like, while engaged in a phone call. This motion sensing methodology also is used to determine if a communications device in motion is attempting to transmit data (e.g., network, Internet, Short Messaging System—SMS, Multimedia Messaging System—MMS). The additional hands free apparatus connection state information, however, is not determined for such data transmissions.

Applications of controlling the use of a communications device in accordance with motion of the communications device could result in, for example, a reduction of the number of vehicular accidents associated with unsafe communications device use while operating a vehicle (automobile, bicycle, motorcycle, train, bus, airplane, etc.). Controlling the use of a communications device in accordance with motion of the communications device also can enable parents to provide additional security features for their children. This can be non-invasive and can be turned off anytime an appropriate hands free apparatus is connected to the communications device. The user acknowledged bypass technology can also provide value in determining blame for accidents caused by unlawful use of wireless devices in states that mandate use hands free devices.

Figure 1:
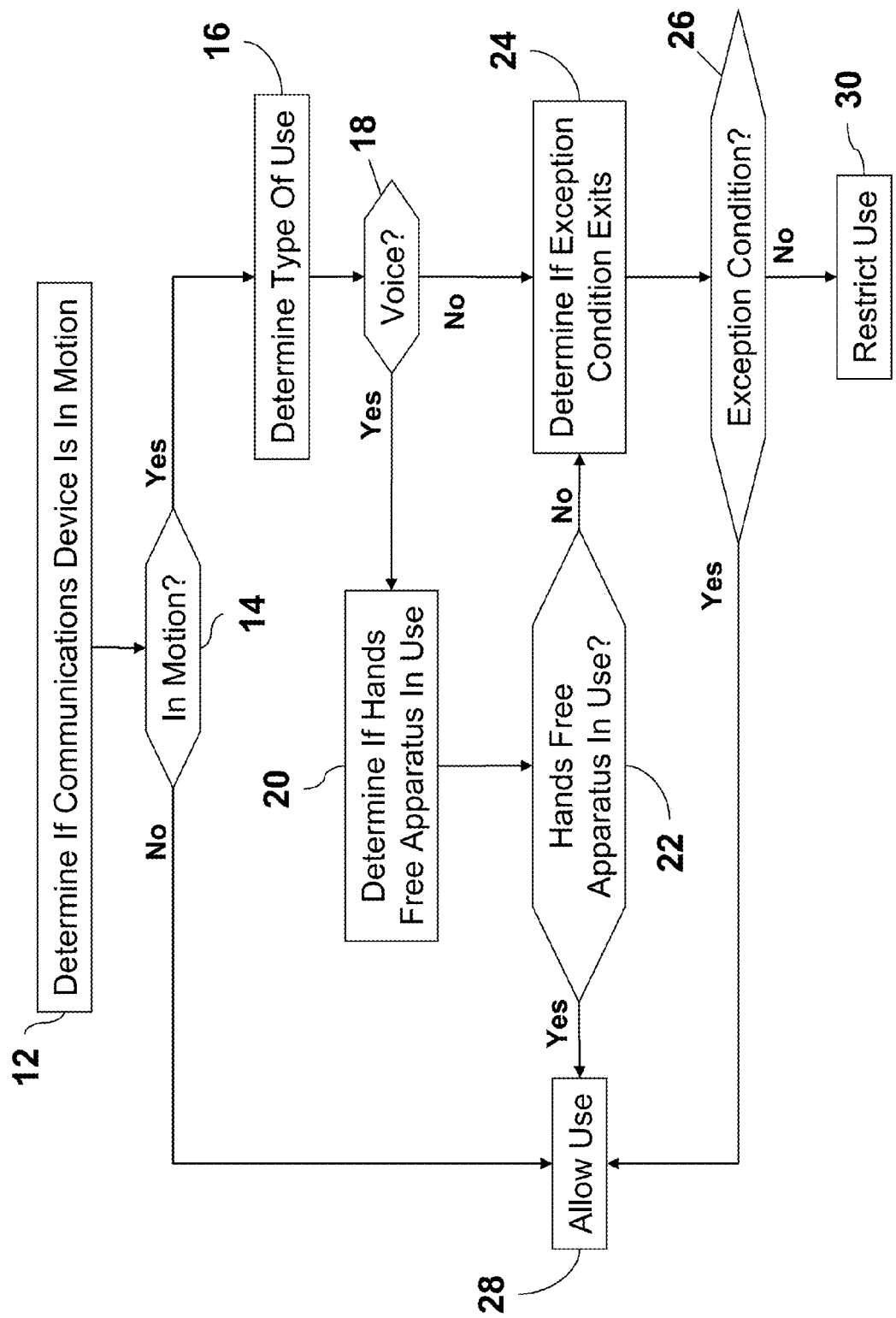
FIG. 1 is a flow diagram of an example process for controlling a communications device in accordance with motion of the communications device.

FIG. 1 is a flow diagram of an example process for controlling use of a communications device in accordance with motion of the communications device. At step 12, it is determined if a communications device is in motion. The communications device can be determined to be in motion via any appropriate means. For example, a location of the communications device can be polled to determine if the communications device is in motion. Thus, changes in the location, taken over a period of time, could indicate that the communications device is in motion. Changes in the location are analyzed to ensure that the communications device is in motion, such as in a vehicle in motion, rather than being moved by a stationary, or ambulating user. Typically, mobile devices connected to a cellular network are in constant communications with a switching center. Within a GSM network the Broadcast Control Channel (BCCH) is used for such communications. The BCCH is the downlink channel which contains specific parameters such as the LAC (Location Area Code) and RAC (Routing Area Code), the MNC (Mobile Network Code) and BA (BCCH Allocation) list.

The BCCH detailed information includes Country code, Network code, Location area code, Cell identity, Adjacent cell list, BCCH location, and Minimum received signal strength, of which the Location area code, Cell identity, and the Adjacent cell list can be utilized to locate a communications device. Within cellular systems, the base station or cell sites have a limited amount of channels for radio use. Spacing of sites is in place in order to reuse the radio frequency spectrum. In suburban areas, cell sites are commonly spaced 1-2 miles apart. In cities areas the distance may be close as ¼-½ mile apart.

Mobile devices update location as they move from cell site to cell site. This information is homed at the mobile switch and may be accessed by third party applications. It may be calculated based on timing that if the device is moving from one cell site to another quickly then that device is moving in a vehicle.

The location of a communications device can be determined via any appropriate means. For example, any of the following techniques, individually or in any combination can be used to determine location of a communications device: the location of a cellular site in which a communications device resides, GPS, A-GPS, triangulation, time difference of arrival (TDOA), direction of arrival, angle of arrival (AOA), time of arrival (TOA), or absolute timing.

If it is determined (step 14) that the communications device is not in motion, use of the communications device is allowed at step 28. If it is determined (step 14) that the communications device is in motion, the type of use of the communications device is determined at step 16. The type of use can include, for example, sending a voice call, receiving a voice call, sending a text message, generating a text message, sending a short messaging service (SMS) message, generating an SMS message, sending a multimedia messaging service (MMS) message, or generating an MMS message.

If it is determined (step 18) that the type of call is other than voice, use of the communications device is restricted unless an exception condition exists. Thus, at step 24, it is determined if an exception condition exists. If it is determined that an exception condition exists (step 26), use of the communications device is allowed at step 28. If it is determined that an exception condition does not exist (step 26), use of the communications device is restricted at step 30. Exception conditions are conditions that would warrant use of the communications device, even though the communications device is in motion. For example, an exception condition can include an emergency, a call to 911, or the like. In an example embodiment, the existence of an exception condition is determined by a phone number that is being used. For example, a call to 911 would result in a determination that an exception condition exists. In an example embodiment, phone numbers can be stored in the communications device and identified as phone numbers associated with exception conditions. For example, a phone number to a police station or fire department could be stored and identified as associated with exception condition. Thus, when such a number is dialed, use of the communications device is allowed. Another example of an exception condition is when the communication device is being used by a passenger in a vehicle. In various embodiments, the passenger could enter an indication on her/his communications device that he/she is a passenger, a switch/detector could be placed under a seat and an indication thereof could be sent to the communications network, or any combination thereof. Exception conditions could be dictated by local, state, and federal law. Also, service providers, or the like, could dictate acceptable device usage policies on devices they own and employees' use.

If it is determined (step 18) that the type of call is voice, it is determined, at step 20, if a hands free apparatus is being used with the communications device. Determining that the type of use is voice includes determining that voice call is attempting to be sent, a voice call is attempting to be answered, a phone number is being entered, or a combination thereof. A hands free apparatus can include, for example, a headset, the communications device in a speaker phone configuration, a remote microphone (e.g., microphone on a vehicle that is in communication with the communications device), or the like. In an example embodiment, it is determined that a hands free apparatus is in use if auxiliary equipment (e.g., headset, remote microphone, etc.,) is paired with the communications device. The auxiliary equipment can be paired with the communications device via any appropriate means, such as Bluetooth® for example. In another example embodiment, it is determined that a hands free apparatus is in use if the communications device is in speaker phone configuration. If it is determined that a hands free apparatus is in use (step 22), use of the communications device is allowed at step 28. If it is determined that a hands free apparatus is not in use (step 22), use of the communications device is restricted unless an exception condition exists. Thus, at step 24, it is determined if an exception condition exists. If it is determined that an exception condition exists (step 26), use of the communications device is allowed at step 28. If it is determined that an exception condition does not exist (step 26), use of the communications device is restricted at step 30.

Figure 2:
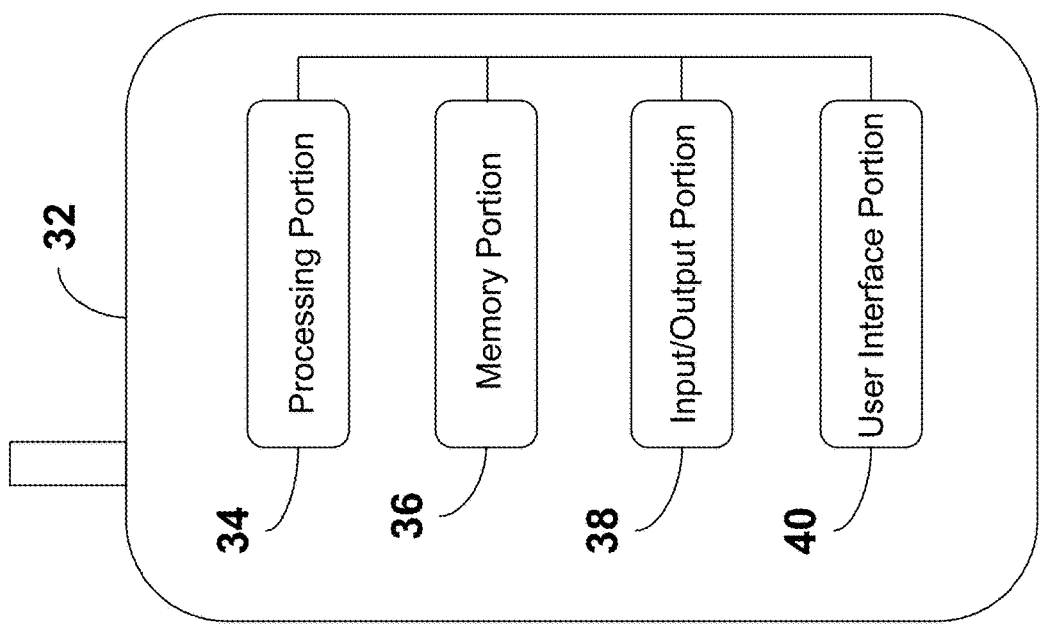
FIG. 2 is a block diagram of an example communications device configured to be controlled in accordance with motion of the communications device.

FIG. 2 is a block diagram of an example communications device 32 configured to be controlled in accordance with motion thereof. In an example configuration, communications device 32 is a mobile wireless device. The communications device 32 can comprise any appropriate device, examples of which include a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a walkman, etc.), a portable navigation device (e.g., GPS compatible device, A-GPS compatible device, etc.), or a combination thereof. The communications device 32 can include devices that are not typically thought of as portable, such as, for example, a navigation device installed in-vehicle, or the like. The mobile communications device 32 can include non-conventional computing devices, such as, for example, a motor vehicle control (e.g., steering wheel), an in-dash vehicle integrated GPS/wireless device, etc., or the like.

The communications device 32 can include any appropriate device, mechanism, software, and/or hardware for controlling the communications device 32 in accordance with motion thereof, as described herein. In an example embodiment, the ability to control the communications device 32 in accordance with motion thereof is a feature of the communications device 32 that can be turned on and off. Thus, an owner/user of the communications device 32 can opt-in or opt-out of this capability. The ability to control the communications device 32 in accordance with motion thereof can be remotely enabled or disabled. Thus, the ability to enabled or disabled control can be accomplished via a network (e.g., Internet, wireless communication network, etc.). Thus, the ability to control the communications device in accordance with motion thereof is remotely enableable and disableable.

In an example configuration, the communications device 32 comprises a processing portion 34, a memory portion 36, an input/output portion 38, and a user interface (UI) portion 40. It is emphasized that the block diagram depiction of communications device 32 is exemplary and not intended to imply a specific implementation and/or configuration. For example, in an example configuration, the communications device 32 comprises a cellular phone and the processing portion 34 and/or the memory portion 36 are implemented, in part or in total, on a subscriber identity module (SIM) of the mobile communications device 32. In another example configuration, the communications device 32 comprises a laptop computer. The laptop computer can include a SIM, and various portions of the processing portion 34 and/or the memory portion 36 can be implemented on the SIM, on the laptop other than the SIM, or any combination thereof.

The processing portion 34, memory portion 36, and input/output portion 38 are coupled together to allow communications therebetween. In various embodiments, the input/output portion 38 comprises a receiver of the communications device 32, a transmitter of the communications device 32, or a combination thereof. The input/output portion 38 is capable of receiving and/or providing information pertaining to controlling the communications device 32 in accordance with motion thereof, as described herein. For example, the input/output portion 38 is capable of receiving and/or sending a voice call, a text message, an SMS message, an MMS message, or the like, or any combination thereof, as described herein. In an example embodiment, the input/output portion 38 is capable of receiving and/or sending information to determine a location of the communications device 32. In an example configuration, the input\output portion 38 comprises a GPS receiver. In various configurations, the input/output portion 38 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 34 is capable of performing functions pertaining to controlling the communications device 32 in accordance with motion thereof, as described herein. For example, the processing portion 34 is capable of, allowing use of the communications device 32, restricting use of the communications device 32, determining if the communications device 32 is in motion, determining a type of use of the communications device 32, determining if a hands free apparatus is in use, determination if an exception condition exists, or any combination thereof, as described herein.

In a basic configuration, the communications device 32 can include at least one memory portion 36. The memory portion 36 can store any information utilized in conjunction with controlling the communications device 32 in accordance with motion thereof, as described herein. For example, the memory portion 36 is capable of storing information pertaining to location of a communications device 32, subscriber profile information, subscriber identification information, phone numbers associated with an exception condition, information utilized to determine if the communications device 32 is in motion, information utilized to determine the type of use of the communications device 32, information utilized to determine if a hands free apparatus is in use, information utilized to determine if an exception condition exists, information utilized to allow use of the communications device 32, information utilized to restrict use of the communications device 32, or any combination thereof, as described herein. Depending upon the exact configuration and type of processor, the memory portion 36 can be volatile (such as some types of RAM), non-volatile (such as ROM, flash memory, etc.), or a combination thereof. The communications device 32 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile communications device 32.

The communications device 32 also can contain a UI portion 40 allowing a user to communicate with the communications device 32. The UI portion 40 is capable of rendering any information utilized in conjunction with controlling the communications device 32 in accordance with motion thereof, as described herein. For example, the UI portion 40 can provide means for entering text, entering a phone number, rendering text, rendering images, rendering multimedia, rendering sound, rendering video, or the like, as described herein. The UI portion 40 can provide the ability to control the communications device 32, via, for example, buttons, soft keys, voice actuated controls, a touch screen, movement of the mobile communications device 32, visual cues (e.g., moving a hand in front of a camera on the mobile communications device 32), or the like. The UI portion 40 can provide visual information (e.g., via a display), audio information (e.g., via speaker), mechanically (e.g., via a vibrating mechanism), or a combination thereof. In various configurations, the UI portion 40 can comprise a display, a touch screen, a keyboard, an accelerometer, a motion detector, a speaker, a microphone, a camera, a tilt sensor, or any combination thereof. The UI portion 40 can comprise means for inputting biometric information, such as, for example, fingerprint information, retinal information, voice information, and/or facial characteristic information.

The communications device 32 can be part of and/or in communication with various wireless communications networks. Some of which are described below.

Figure 3:
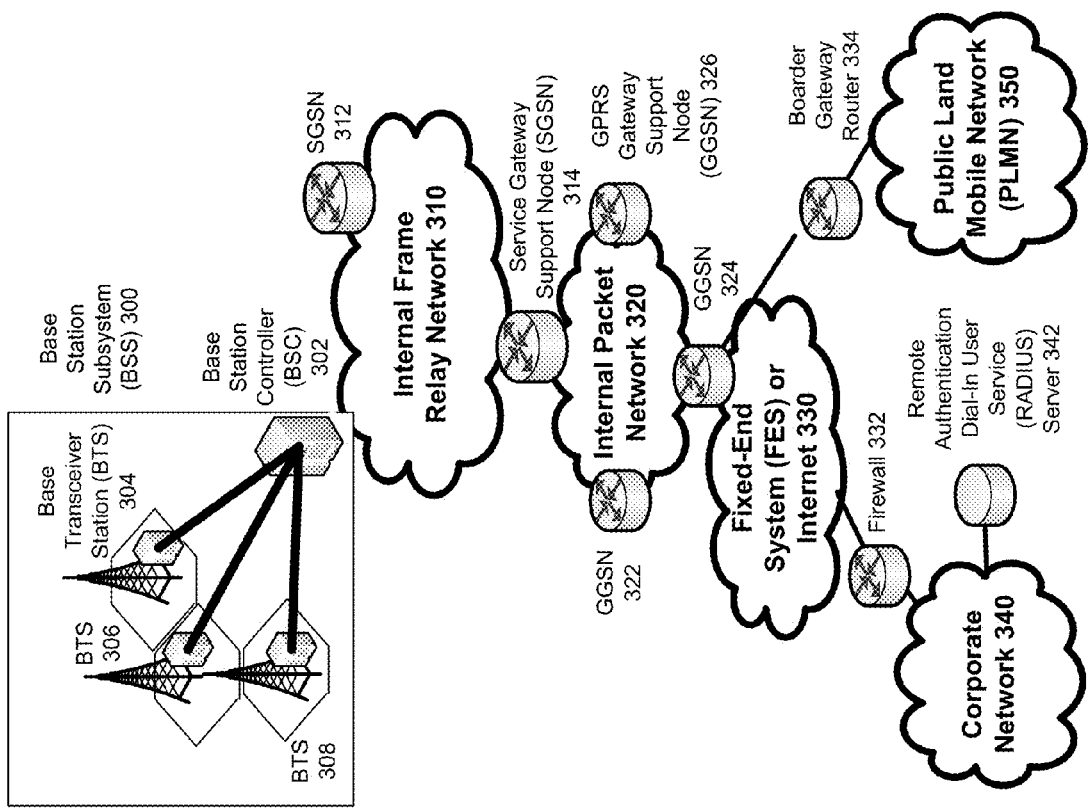
FIG. 3 depicts an overall block diagram of an exemplary packet-based mobile cellular network environment, such as a GPRS network, in which a communications device configured to be controlled in accordance with motion thereof can be implemented.

FIG. 3 depicts an overall block diagram of an exemplary packet-based mobile cellular network environment, such as a GPRS network, in which automated communications device field testing, performance management, and resource allocation can be implemented. In the exemplary packet-based mobile cellular network environment shown in FIG. 3, there are a plurality of Base Station Subsystems ("BSS") 300 (only one is shown), each of which comprises a Base Station Controller ("BSC") 302 serving a plurality of Base Transceiver Stations ("BTS") such as BTSs 304, 306, and 308. BTSs 304, 306, 308, etc. are the access points where users of packet-based mobile devices become connected to the wireless network. In exemplary fashion, the packet traffic originating from user devices is transported via an over-the-air interface to a BTS 308, and from the BTS 308 to the BSC 302. Base station subsystems, such as BSS 300, are a part of internal frame relay network 310 that can include Service GPRS Support Nodes ("SGSN") such as SGSN 312 and 314. Each SGSN is connected to an internal packet network 320 through which a SGSN 312, 314, etc. can route data packets to and from a plurality of gateway GPRS support nodes (GGSN) 322, 324, 326, etc. As illustrated, SGSN 314 and GGSNs 322, 324, and 326 are part of internal packet network 320. Gateway GPRS serving nodes 322, 324 and 326 mainly provide an interface to external Internet Protocol ("IP") networks such as Public Land Mobile Network ("PLMN") 350, corporate intranets 340, or Fixed-End System ("FES") or the public Internet 330. As illustrated, subscriber corporate network 340 may be connected to GGSN 324 via firewall 332; and PLMN 350 is connected to GGSN 324 via boarder gateway router 334. The Remote Authentication Dial-In User Service ("RADIUS") server 342 may be used for caller authentication when a user of a mobile cellular device calls corporate network 340.

Generally, there can be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 4:
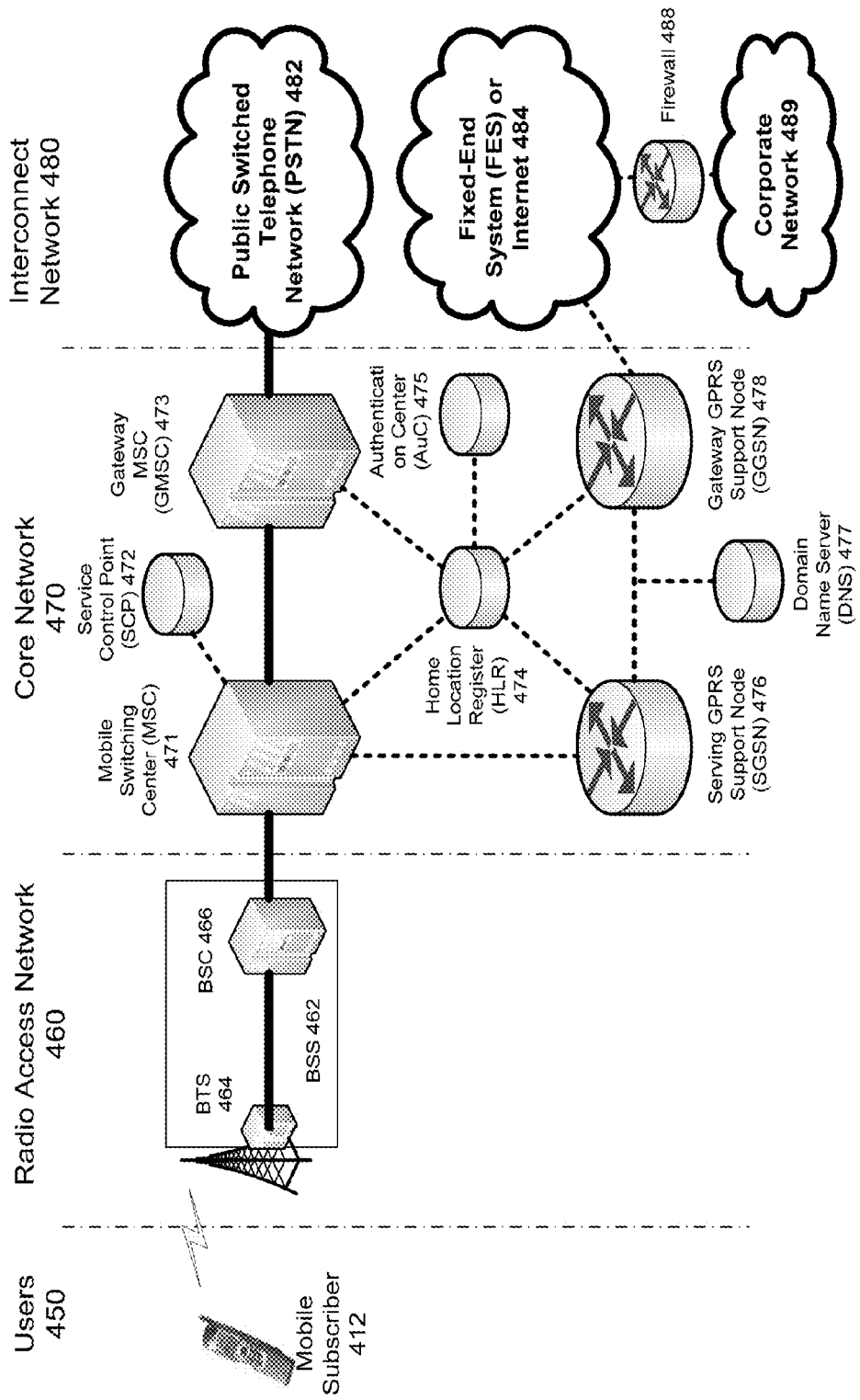
FIG. 4 illustrates an example architecture of a typical GPRS network in which a communications device configured to be controlled in accordance with motion thereof can be implemented.

FIG. 4 illustrates an architecture of a typical GPRS network in which automated communications device field testing, performance management, and resource allocation can be implemented. The architecture depicted in FIG. 4 is segmented into four groups: users 450, radio access network 460, core network 470, and interconnect network 480. Users 450 comprise a plurality of end users. Note, device 412 is referred to as a mobile subscriber in the description of network shown in FIG. 4. In an example embodiment, the device depicted as mobile subscriber 412 comprises a communications device (e.g., communications device 32). Radio access network 460 comprises a plurality of base station subsystems such as BSSs 462, which include BTSs 464 and BSCs 466. Core network 470 comprises a host of various network elements. As illustrated in FIG. 4, core network 470 may comprise Mobile Switching Center ("MSC") 471, Service Control Point ("SCP") 472, gateway MSC 473, SGSN 476, Home Location Register ("HLR") 474, Authentication Center ("AuC") 475, Domain Name Server ("DNS") 477, and GGSN 478. Interconnect network 480 also comprises a host of various networks and other network elements. As illustrated in FIG. 4, interconnect network 480 comprises Public Switched Telephone Network ("PSTN") 482, Fixed-End System ("FES") or Internet 484, firewall 488, and Corporate Network 489.

A mobile switching center can be connected to a large number of base station controllers. At MSC 471, for instance, depending on the type of traffic, the traffic may be separated in that voice may be sent to Public Switched Telephone Network ("PSTN") 482 through Gateway MSC ("GMSC") 473, and/or data may be sent to SGSN 476, which then sends the data traffic to GGSN 478 for further forwarding.

When MSC 471 receives call traffic, for example, from BSC 466, it sends a query to a database hosted by SCP 472. The SCP 472 processes the request and issues a response to MSC 471 so that it may continue call processing as appropriate.

The HLR 474 is a centralized database for users to register to the GPRS network. HLR 474 stores static information about the subscribers such as the International Mobile Subscriber Identity ("IMSI"), subscribed services, and a key for authenticating the subscriber. HLR 474 also stores dynamic subscriber information such as the current location of the mobile subscriber. Associated with HLR 474 is AuC 475. AuC 475 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 4, when mobile subscriber 412 initiates the attach process by turning on the network capabilities of the mobile device, an attach request is sent by mobile subscriber 412 to SGSN 476. The SGSN 476 queries another SGSN, to which mobile subscriber 412 was attached before, for the identity of mobile subscriber 412. Upon receiving the identity of mobile subscriber 412 from the other SGSN, SGSN 476 requests more information from mobile subscriber 412. This information is used to authenticate mobile subscriber 412 to SGSN 476 by HLR 474. Once verified, SGSN 476 sends a location update to HLR 474 indicating the change of location to a new SGSN, in this case SGSN 476. HLR 474 notifies the old SGSN, to which mobile subscriber 412 was attached before, to cancel the location process for mobile subscriber 412. HLR 474 then notifies SGSN 476 that the location update has been performed. At this time, SGSN 476 sends an Attach Accept message to mobile subscriber 412, which in turn sends an Attach Complete message to SGSN 476.

After attaching itself with the network, mobile subscriber 412 then goes through the authentication process. In the authentication process, SGSN 476 sends the authentication information to HLR 474, which sends information back to SGSN 476 based on the user profile that was part of the user's initial setup. The SGSN 476 then sends a request for authentication and ciphering to mobile subscriber 412. The mobile subscriber 412 uses an algorithm to send the user identification (ID) and password to SGSN 476. The SGSN 476 uses the same algorithm and compares the result. If a match occurs, SGSN 476 authenticates mobile subscriber 412.

Next, the mobile subscriber 412 establishes a user session with the destination network, corporate network 489, by going through a Packet Data Protocol ("PDP") activation process. Briefly, in the process, mobile subscriber 412 requests access to the Access Point Name ("APN"), for example, UPS.com, and SGSN 476 receives the activation request from mobile subscriber 412. SGSN 476 then initiates a Domain Name Service ("DNS") query to learn which GGSN node has access to the UPS.com APN. The DNS query is sent to the DNS server within the core network 470, such as DNS 477, which is provisioned to map to one or more GGSN nodes in the core network 470. Based on the APN, the mapped GGSN 478 can access the requested corporate network 489. The SGSN 476 then sends to GGSN 478 a Create Packet Data Protocol ("PDP") Context Request message that contains necessary information. The GGSN 478 sends a Create PDP Context Response message to SGSN 476, which then sends an Activate PDP Context Accept message to mobile subscriber 412.

Once activated, data packets of the call made by mobile subscriber 412 can then go through radio access network 460, core network 470, and interconnect network 480, in a particular fixed-end system or Internet 484 and firewall 488, to reach corporate network 489.

Figure 5:
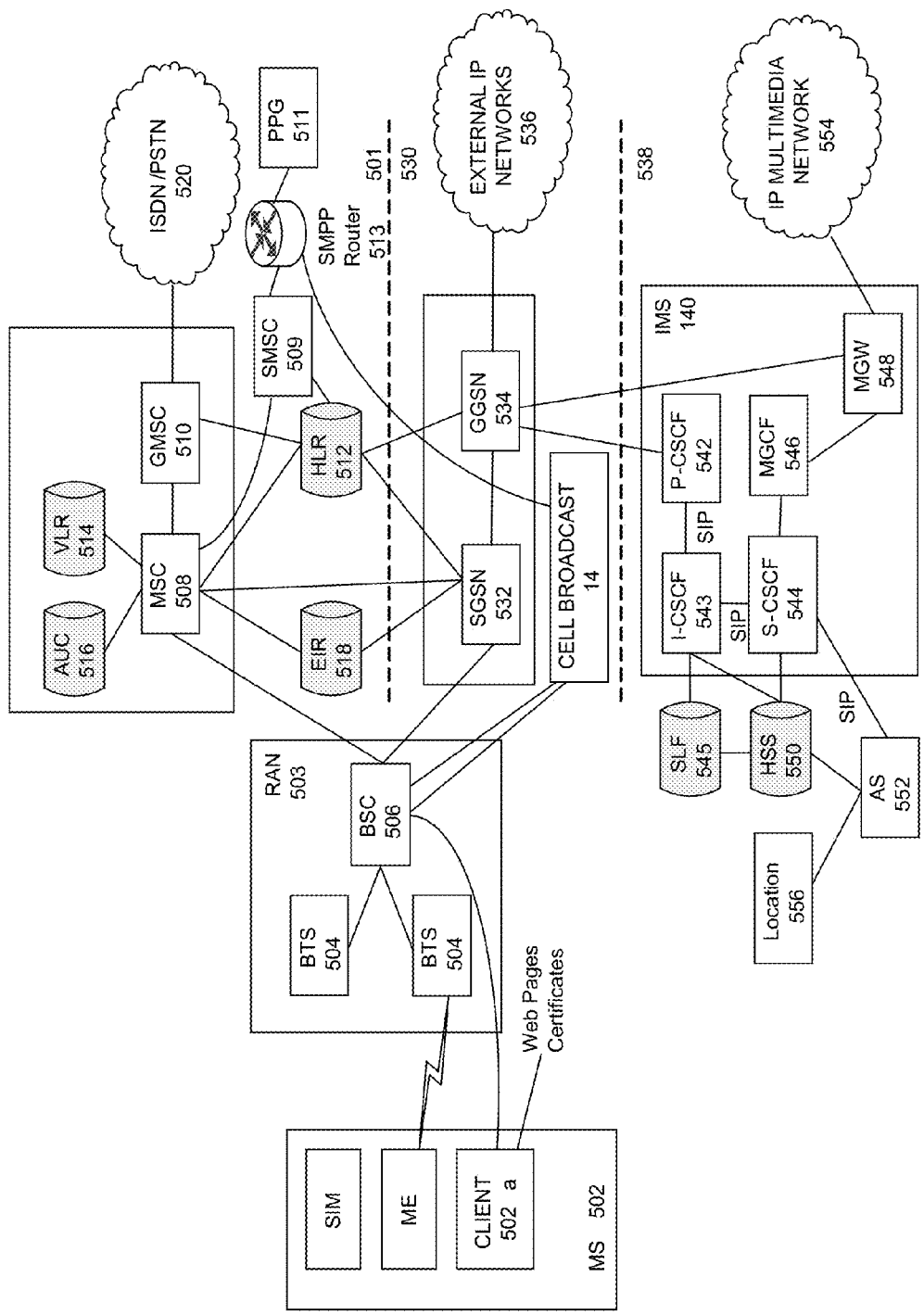
FIG. 5 illustrates an exemplary block diagram view of a GSM/GPRS/IP multimedia network architecture within which a communications device configured to be controlled in accordance with motion thereof can be implemented.

FIG. 5 illustrates an exemplary block diagram view of a GSM/GPRS/IP multimedia network architecture within which automated communications device field testing, performance management, and resource allocation can be implemented. As illustrated, the architecture of FIG. 5 includes a GSM core network 501, a GPRS network 530 and an IP multimedia network 538. The GSM core network 501 includes a Mobile Station (MS) 502, at least one Base Transceiver Station (BTS) 504 and a Base Station Controller (BSC) 506. The MS 502 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 504 is physical equipment, such as a radio tower, that enables a radio interface to communicate with the MS. Each BTS may serve more than one MS. The BSC 506 manages radio resources, including the BTS. The BSC may be connected to several BTSs. The BSC and BTS components, in combination, are generally referred to as a base station (BSS) or radio access network (RAN) 503.

The GSM core network 501 also includes a Mobile Switching Center (MSC) 508, a Gateway Mobile Switching Center (GMSC) 510, a Home Location Register (HLR) 512, Visitor Location Register (VLR) 514, an Authentication Center (AuC) 518, and an Equipment Identity Register (EIR) 516. The MSC 508 performs a switching function for the network. The MSC also performs other functions, such as registration, authentication, location updating, handovers, and call routing. The GMSC 510 provides a gateway between the GSM network and other networks, such as an Integrated Services Digital Network (ISDN) or Public Switched Telephone Networks (PSTNs) 520. Thus, the GMSC 510 provides interworking functionality with external networks.

The HLR 512 is a database that contains administrative information regarding each subscriber registered in a corresponding GSM network. The HLR 512 also contains the current location of each MS. The VLR 514 is a database that contains selected administrative information from the HLR 512. The VLR contains information necessary for call control and provision of subscribed services for each MS currently located in a geographical area controlled by the VLR. The HLR 512 and the VLR 514, together with the MSC 508, provide the call routing and roaming capabilities of GSM. The AuC 516 provides the parameters needed for authentication and encryption functions. Such parameters allow verification of a subscriber's identity. The EIR 518 stores security-sensitive information about the mobile equipment.

A Short Message Service Center (SMSC) 509 allows one-to-one Short Message Service (SMS) messages to be sent to/from the MS 502. A Push Proxy Gateway (PPG) 511 is used to "push" (i.e., send without a synchronous request) content to the MS 502. The PPG 511 acts as a proxy between wired and wireless networks to facilitate pushing of data to the MS 502. A Short Message Peer to Peer (SMPP) protocol router 513 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 502 sends a location update including its current location information to the MSC/VLR, via the BTS 504 and the BSC 506. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 530 is logically implemented on the GSM core network architecture by introducing two packet-switching network nodes, a serving GPRS support node (SGSN) 532, a cell broadcast and a Gateway GPRS support node (GGSN) 534. The SGSN 532 is at the same hierarchical level as the MSC 508 in the GSM network. The SGSN controls the connection between the GPRS network and the MS 502. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 534 provides a gateway between the GPRS network and a public packet network (PDN) or other IP networks 536. That is, the GGSN provides interworking functionality with external networks, and sets up a logical link to the MS through the SGSN. When packet-switched data leaves the GPRS network, it is transferred to an external TCP-IP network 536, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 530 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 538 was introduced with 3GPP Release 5, and includes an IP multimedia subsystem (IMS) 540 to provide rich multimedia services to end users. A representative set of the network entities within the IMS 540 are a call/session control function (CSCF), a media gateway control function (MGCF) 546, a media gateway (MGW) 548, and a master subscriber database, called a home subscriber server (HSS) 550. The HSS 550 may be common to the GSM network 501, the GPRS network 530 as well as the IP multimedia network 538.

The IP multimedia system 540 is built around the call/session control function, of which there are three types: an interrogating CSCF (I-CSCF) 543, a proxy CSCF (P-CSCF) 542, and a serving CSCF (S-CSCF) 544. The P-CSCF 542 is the MS's first point of contact with the IMS 540. The P-CSCF 542 forwards session initiation protocol (SIP) messages received from the MS to an SIP server in a home network (and vice versa) of the MS. The P-CSCF 542 may also modify an outgoing request according to a set of rules defined by the network operator (for example, address analysis and potential modification).

The I-CSCF 543, forms an entrance to a home network and hides the inner topology of the home network from other networks and provides flexibility for selecting an S-CSCF. The I-CSCF 543 may contact a subscriber location function (SLF) 545 to determine which HSS 550 to use for the particular subscriber, if multiple HSS's 550 are present. The S-CSCF 544 performs the session control services for the MS 502. This includes routing originating sessions to external networks and routing terminating sessions to visited networks. The S-CSCF 544 also decides whether an application server (AS) 552 is required to receive information on an incoming SIP session request to ensure appropriate service handling. This decision is based on information received from the HSS 550 (or other sources, such as an application server 552). The AS 552 also communicates to a location server 556 (e.g., a Gateway Mobile Location Center (GMLC)) that provides a position (e.g., latitude/longitude coordinates) of the MS 502.

The HSS 550 contains a subscriber profile and keeps track of which core network node is currently handling the subscriber. It also supports subscriber authentication and authorization functions (AAA). In networks with more than one HSS 550, a subscriber location function provides information on the HSS 550 that contains the profile of a given subscriber.

The MGCF 546 provides interworking functionality between SIP session control signaling from the IMS 540 and ISUP/BICC call control signaling from the external GSTN networks (not shown). It also controls the media gateway (MGW) 548 that provides user-plane interworking functionality (e.g., converting between AMR- and PCM-coded voice). The MGW 548 also communicates with other IP multimedia networks 554.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of controlling a communications device in accordance with motion thereof have been described in connection with various computing devices/processor, the underlying concepts can be applied to any computing device, processor, or system capable of controlling a communications device in accordance with motion thereof. The various techniques described herein can be implemented in connection with hardware or software or, where appropriate, with a combination of both. Thus, the methods and apparatuses for controlling a communications device in accordance with motion thereof, or certain aspects or portions thereof, can take the form of program code (i.e., instructions) embodied in tangible storage media, such as floppy diskettes, CD-ROMs, hard drives, or any other machine-readable storage medium (computer-readable storage medium), wherein, when the program code is loaded into and executed by a machine, such as a computer, the machine becomes an apparatus for controlling a communications device in accordance with motion thereof. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for controlling a communications device in accordance with motion thereof also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for automated communications device field testing, performance management, and resource allocation. When implemented on a general-purpose processor, the program code combines with the processor to provide a unique apparatus that operates to invoke the functionality controlling a communications device in accordance with motion thereof. Additionally, any storage techniques used in connection with controlling a communications device in accordance with motion thereof can invariably be a combination of hardware and software.

While controlling a communications device in accordance with motion thereof has been described in connection with the various embodiments of the various figures, it is to be understood that other similar embodiments can be used or modifications and additions can be made to the described embodiments for controlling a communications device in accordance with motion thereof without deviating therefrom. For example, one skilled in the art will recognize that controlling a communications device in accordance with motion thereof as described in the present application may apply to any environment, whether wired or wireless, and may be applied to any number of such devices connected via a communications network and interacting across the network. Therefore, controlling a communications device in accordance with motion thereof should not be limited to any single embodiment, but rather should be construed in breadth and scope in accordance with the appended claims.

What is claimed:

1. A method comprising:

storing a plurality of phone numbers on a communications device;

associating each phone number of the plurality of phone numbers with an exception condition;

determining that the communications device is moving in a vehicle; and responsive to determining that the communications device is moving in a vehicle, determining if an indication has been received, by the communications device, that a user of the communications device is a passenger;

upon a determination that an indication has not been received, by the communications device, that a user of the communications device is a passenger:

restricting use of the communications device by preventing text messages from being sent from the communications device; and allowing a text message to be sent from the communications device to an intended recipient associated with a phone number of the plurality of phone numbers; and upon a determination that an indication has been received, by the communications device, that a user of the communications device is a passenger, allowing unrestricted use of the communications device.

2. The method of claim 1, further comprising:

utilizing a global positioning system to determine that the communications device is moving in a vehicle.

3. The method of claim 1, further comprising:

responsive to determining that the communications device is moving in a vehicle and an indication has not been received, by the communications device, that a user of the communications device is a passenger:

restricting use of the communications device by preventing a voice call from being sent from the communications device.

4. The method of claim 1, further comprising:

responsive to determining that the communications device is moving in a vehicle and an indication has not been received, by the communications device, that a user of the communications device is a passenger:

restricting use of the communications device by preventing a multimedia message from being sent from the communications device.

5. The method of claim 1, further comprising:

responsive to determining that the communications device is moving in a vehicle and an indication has not been received, by the communications device, that a user of the communications device is a passenger:

restricting use of the communications device by preventing establishing a connection to a network via the communications device.

6. The method of claim 1, wherein restricting use of the communications device is remotely enableable and disableable.

7. An apparatus comprising:

a processor; and memory coupled to the processor, the memory comprising at least one executable instruction that when executed by the processor causes the processor to effectuate operations comprising:

storing a plurality of phone numbers on a communications device;

associating each phone number of the plurality of phone numbers with an exception condition;

determining that the communications device is moving in a vehicle; and responsive to determining that the communications device is moving in a vehicle, determining if an indication has been received, by the communications device, that a user of the communications device is a passenger;

upon a determination that an indication has not been received, by the communications device, that a user of the communications device is a passenger:

restricting use of the communications device by preventing text messages from being sent from the communications device; and allowing a text message to be sent from the communications device to an intended recipient associated with a phone number of the plurality of phone numbers; and upon a determination that an indication has been received, by the communications device, that a user of the communications device is a passenger, allowing unrestricted use of the communications device.

8. The apparatus of claim 7, further comprising:

utilizing a global positioning system to determine that the communications device is moving in a vehicle.

9. The apparatus of claim 7, the operations further comprising:

responsive to determining that the communications device is moving in a vehicle and an indication has not been received, by the communications device, that a user of the communications device is a passenger:

restricting use of the communications device by preventing a voice call from being sent from the communications device.

10. The apparatus of claim 7, the operations further comprising:

responsive to determining that the communications device is moving in a vehicle and an indication has not been received, by the communications device, that a user of the communications device is a passenger:

restricting use of the communications device by preventing a multimedia message from being sent from the communications device.

11. The apparatus of claim 7, the operations further comprising:

responsive to determining that the communications device is moving in a vehicle and an indication has not been received, by the communications device, that a user of the communications device is a passenger:

restricting use of the communications device by preventing establishing a connection to a network via the communications device.

12. The apparatus of claim 7, wherein restricting use of the communications device is remotely enableable and disableable.

13. A computer-readable storage medium that is not a propagating signal, the computer-readable storage medium comprising executable instructions that when executed by a processor cause the processor to effectuate operations comprising:

storing a plurality of phone numbers on a communications device;

associating each phone number of the plurality of phone numbers with an exception condition;

determining that the communications device is moving in a vehicle; and responsive to determining that the communications device is moving in a vehicle, determining if an indication has been received, by the communications device, that a user of the communications device is a passenger;

upon a determination that an indication has not been received, by the communications device, that a user of the communications device is a passenger:

restricting use of the communications device by preventing text messages from being sent from the communications device; and allowing a text message to be sent from the communications device to an intended recipient associated with a phone number of the plurality of phone numbers; and upon a determination that an indication has been received, by the communications device, that a user of the communications device is a passenger, allowing unrestricted use of the communications device.

14. The computer-readable storage medium of claim 13, the operations further comprising:

utilizing a global positioning system to determine that the communications device is moving in a vehicle.

15. The computer-readable storage medium of claim 13, the operations further comprising:

responsive to determining that the communications device is moving in a vehicle and an indication has not been received, by the communications device, that a user of the communications device is a passenger:

restricting use of the communications device by preventing a voice call from being sent from the communications device.

16. The computer-readable storage medium of claim 13, the operations further comprising:

responsive to determining that the communications device is moving in a vehicle and an indication has not been received, by the communications device, that a user of the communications device is a passenger:

restricting use of the communications device by preventing a multimedia message from being sent from the communications device.

17. The computer-readable storage medium of claim 13, the operations further comprising:

responsive to determining that the communications device is moving in a vehicle and an indication has not been received, by the communications device, that a user of the communications device is a passenger:

restricting use of the communications device by preventing establishing a connection to a network via the communications device.

18. The computer-readable storage medium of claim 13, wherein restricting use of the communications device is remotely enableable and disableable.

19. The method of claim 1, wherein the indication is received from a seat detector within the vehicle.

20. The method of claim 1, wherein upon a determination that an indication that a user of the communications device is a passenger has not been received by the communications device, providing, by the communications device, a warning tone.

* * * * *